Figure 1:
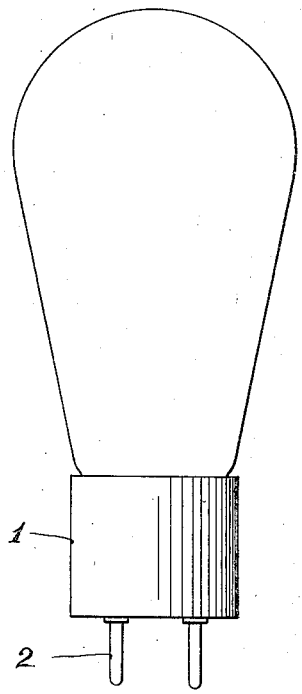
Figure 2:
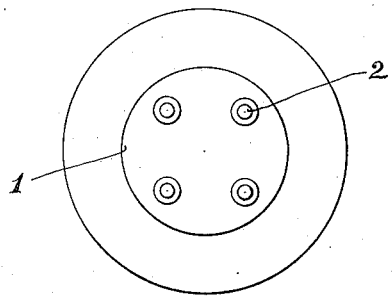

Dec. 15, 1936.  H. R. THIES  2,064,768

ELECTRICAL INSULATION

Filed Oct. 4, 1935

Inventor
HERMAN R. THIES

By

Attorney

Patented Dec. 15, 1936

2,064,768

UNITED STATES PATENT OFFICE 2,064,768

ELECTRICAL INSULATION

Herman R. Thies, Stow, Ohio, assignor to Wingfoot Corporation, Wilmington, Del., a corporation of Delaware Application October 4, 1935, Serial No. 43,555

1 Claim. (Cl. 106—13)

This invention relates to an improvement in electrical insulation. More particularly the invention relates to the use of a condensation derivative of rubber as electrical insulation and more particularly as a molded base for a radio tube.

Condensation derivatives of rubber are prepared by treating rubber with condensing agents such as halides of amphoteric metals, for example, tin tetrachloride, ferric chloride, etc. or with such agents as chlorostannic acid. When chlorostannic acid is employed a chlorine-containing derivative is formed, and this is a preferred form of condensation derivative for carrying out this invention. This derivative may, for example, be prepared as follows:

A rubber cement is prepared by dissolving in benzene 10% based on the weight of the benzene, of pale crepe rubber which has been plasticized by known means to a condition such that a $\frac{9}{16}$ cubic inch sample thereof when placed on a flat plate beneath a flat 10-kilogram weight for 3½ minutes in a cabinet heated to a temperature of 70° C. is flattened out to a thickness slightly less than ⅛ inch. This corresponds to a plasticity figure in the neighborhood of 300 as determined by the Williams plastometer, an instrument used extensively in the art. Although unvulcanized rubber of any plasticity value may be employed and although it is recognized that rubber having a certain plasticity figure gives a conversion product better adapted to some uses than to others, it has been found that rubber prepared as described above is generally satisfactory.

Approximately 350 gallons of the cement so prepared are then placed in a steam-jacketed Day mixer containing a reflux condenser or similar apparatus, whereupon approximately 10% of hydrated chlorostannic acid ($H_2SnCl_6.6H_2O$), based on the weight of the rubber in the cement, is added. The chlorostannic acid may be conveniently prepared by adding sufficient aqueous hydrochloric acid to tin tetra chloride to provide the water for the hydrate and then saturating with hydrogen chloride gas at room temperature. The mixture is heated and agitated for a period of three hours at temperatures preferably between 65 and 80° C., but in any event near the boiling point of the particular solvent used. Samples should be taken every few minutes and the viscosities thereof determined by suitable means. Usually the desired viscosity is obtained after a reaction period of about six hours, although this figure varies somewhat from batch to batch.

Any viscosity instrument may be used, one such being a Gardner mobilometer, an instrument measuring the viscosity of a sample in terms of the time in minutes required for a plunger of known weight and area to fall a known distance in a cylinder of known volume containing the test sample. The clearance between the plunger and the wall of the cylinder is also known. It is preferable to take all readings at one temperature, 25° C. being selected as suitable in the examples herein described. In the latter, the mobilometer used had the following dimensions:

| | |
|---|---|
| Thickness of plunger disk inches | 0.066 |
| Diameter of plunger disk do | 1.502 |
| Diameter of plunger shaft do | 0.248 |
| Inside diameter of cylinder containing test sample inches | 1.535 |
| Height of cylinder do | 9.0 |
| Length of plunger shaft do | 20.0 |
| Distance between the two marks on plunger shaft inches | 7.484 |
| Total weight of shaft, top weight and disk grams | 68.6 |

When the viscosity of the cement reaches a point about .05 to .07 minutes above the desired final viscosity, generally in the range of 0.20 ±.10 minutes, the reaction is preferably stopped either by the addition of 40 grams of sodium hydroxide, dissolved in water, per pound of chlorostannic acid used in the reaction or by the addition of one pint of water per pound of chlorostannic acid used. The batch is then cooled and filtered, after which the reacted cement in the ratio of 350 gallons of cement to 450 gallons of water is discharged into water at ordinary room temperature and agitated by an impeller rotating at approximately 240 R. P. M. In certain cases it will be found desirable to add ¾ of an ounce of sodium sulfite per gallon of water prior to the addition of the reacted cement for the purpose of preventing oxidation of the product.

Thereupon steam is introduced into the water-cement mixture at such a rate that the vapor temperature in an ordinary column extending from the reactor to a condenser reaches 154° F. in 40 minutes. During the next thirty minutes the temperature is maintained at 154° F., during which interval the majority of the solvent distills over into a condenser. The temperature is then increased to 210° F. in the next 50 minutes and permitted to remain there for another 25 minutes, during which practically all of the remainder of the solvent distills off. The chlorostannic acid conversion product of rubber precipitates in a finely divided, sand-like form and may then be centrifuged, washed with water and dried in a vacuum oven.

In the process disclosed herein, a cement which has been reacted to a viscosity of approximately 0.35 minutes gives a conversion product softening in the neighborhood of 50° C. Similarly, a reacted cement with a viscosity of 0.30 minutes gives a conversion product softening around 70° C. One of 0.20 minutes gives a product softening at approximately 90° C. and one of 0.10 minutes softens at 140° C. In forming a radio tube base it is preferable to use a product with a softening point within the higher range.

This conversion product is light in weight. Its moisture absorption is very low being only about 0.02% after being immersed in water for 24 hours. It is resistant to strong alkalies and to most acids except concentrated nitric and sulfuric acids. It is insoluble in acetone and alcohols. It has a low inflammability burning only with a very low flame. Its tensile strength is 4000–5000 pounds per square inch and its transverse strength 7000–9000 pounds per square inch. Its strength under compression is 8500 to 11,000 pounds per square inch. By dipping in chlorine water it may be made substantially resistant to oils. It is thermoplastic and molds readily at temperatures in the neighborhood of from 200° F. to 300° F. and higher, and pressures of 1000 pounds per square inch or more.

Experiments were run to determine the electrical properties of the material. It is an exceptionally good insulating material and is particularly good material for such use under humid conditions or under conditions where the humidity may at times be high. The surface resistivity is at least $10^{12}$ ohms per linear inch after subjection to an atmosphere of 90% relative humidity for a considerable period. The results of tests carefully carried out by a commercial laboratory of high standing were:

The surface and volume resistivity were determined by the method described in the proceedings of the American Society for Testing Materials, vol. 32, part 1, pages 873–885. The method is designated as tentative standard D 257–32 T. The humidity was maintained within ± 2% and the temperature within ± 1%. The surface resistivity was about $1 \times 10^{16}$ ohms per cm./cm. at 50% relative humidity and 0.2 to $1.0 \times 10^{16}$ ohms per cm./cm. at 90% relative humidity. The volume resistivity was about $5 \times 10^{16}$ ohms per cm.$^2$/cm. at 50% relative humidity and 2 to $5 \times 10^{16}$ ohms per cm.$^2$/cm. at 90% relative humidity.

In measuring the insulation resistivity the measuring apparatus was the same as that used for surface and volume resistivity. The specimens were bars ½" square and 5" long. Each electrode consisted of two brass bars ¼" thick by ⅜" wide clamped to opposite sides of the specimen with machine screws. The electrodes were spaced 1" apart. A sheet of lead foil was clamped under the bars to provide better contact and was torn off and caulked at the edge of the electrode. The limit of sensitivity was $5 \times 10^{14}$ ohms. The insulation resistance was found to be greater than $5 \times 10^{14}$ ohms at 50% relative humidity and of the order of $10^{12}$ ohms at 90% relative humidity.

The dielectric constant and power factor were made by the substitution bridge method using an equal arm bridge and standard precision condenser. The set up for 60 cycle and audio frequencies was essentially that of the American Society for Testing Materials found in their volume 32, part 1, page 833. It is there designated as method D 150–32 T. Inasmuch as the methods suggested in the ASTM specification for use at 100–1500 kc. are apparently open to serious errors, use was made of recent researches of the General Radio Company and the 1000 kc. measurements were made on their new type 516 C bridge. The average of various tests was:

| Frequency | Dielectric constant | Power factor |
|---|---|---|
| 60 cycles | 2.70 | 0.60 |
| 1000 cycles | 2.67 | 0.23 |
| 5000 cycles | 2.66 | 0.20 |
| 10000 cycles | 2.67 | 0.23 |
| 1000 kilocycles | 2.68 | 0.16 |

The chlorine containing condensation derivative which was obtained in a substantially unoxidized condition and substantially free from water soluble ingredients, by the method described above was molded in the usual hot press used for radio tube bases. The usual metal inserts were held in place during the molding operations.

The drawing shows a usual type of radio tube. The molded base is indicated at 1. Metal inserts are indicated at 2.

An ordinary plug of a standard type for insertion in sockets in floors, etc. was also molded of the chlorine-containing condensation derivative of rubber.

Such molded insulators are particularly valuable for use where humid conditions are encountered. Plasticizers, etc. may be added to the rubber derivative. For cable insulation, for example, the rubber derivative may be plasticized with low protein rubber.

This application is in part a continuation of application Ser. No. 655,678 filed February 7, 1933.

I claim:

As electrical insulation between electrical conductors a substantially unoxidized chlorine-containing condensation derivative of rubber prepared by the treatment of rubber in solution with chlorostannic acid with subsequent decomposition of the addition product thus formed, said rubber derivative being substantially free from water soluble materials and having a surface resistivity of at least $10^{12}$ ohms per linear inch in an atmosphere of 90% relative humidity at 25° C.

HERMAN R. THIES.